(12) United States Patent
Shmueli et al.

(10) Patent No.: US 6,986,030 B2
(45) Date of Patent: Jan. 10, 2006

(54) PORTABLE MEMORY DEVICE INCLUDES SOFTWARE PROGRAM FOR INTERACTING WITH HOST COMPUTING DEVICE TO PROVIDE A CUSTOMIZED CONFIGURATION FOR THE PROGRAM

(75) Inventors: Shimon Shmueli, Raleigh, NC (US); Alex Lang, Raleigh, NC (US); Jean Billman, Chapel Hill, NC (US)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 684 days.

(21) Appl. No.: 09/802,691

(22) Filed: Mar. 9, 2001

(65) Prior Publication Data

US 2002/0147912 A1 Oct. 10, 2002

Related U.S. Application Data

(60) Provisional application No. 60/243,816, filed on Oct. 27, 2000.

(51) Int. Cl.
*G06F 15/177* (2006.01)
*H04L 9/00* (2006.01)

(52) U.S. Cl. .......................................... 713/1; 713/200
(58) Field of Classification Search ................ 713/100, 713/200, 201, 1, 155; 709/220, 229; 725/30
See application file for complete search history.

(56) References Cited

U.S. PATENT DOCUMENTS

| | | | |
|---|---|---|---|
| 5,404,485 A | 4/1995 | Ban | 395/425 |
| 5,497,455 A | 3/1996 | Suga et al. | 395/159 |
| 5,519,843 A | 5/1996 | Moran et al. | 395/430 |
| 5,535,357 A | 7/1996 | Moran et al. | 395/430 |

(Continued)

OTHER PUBLICATIONS

"Portable Internet Settings", IBM Technical Disclosure Bulletin, Dec. 1, 1997, vol. No. 40, Issue No. 12, pp. 183–184.*

Ecommerce–guide.com, "BuyWiz Unveils Universal Shopping Cart", www.ecommerce.internet.com/news/insights/trends, Aug. 29, 1999.

Anonymous, "Wireless Local Area Network Cuts Costs, Setup Time", Modern Materials Handing, Jun. 1997, Scan Tech News, p. S–24.

*Primary Examiner*—Chun Cao
(74) *Attorney, Agent, or Firm*—Withrow & Terranova, PLLC

(57) ABSTRACT

The present invention uses a portable memory device to directly or wirelessly interact with one or more host computing devices to provide a customized configuration for one or more aspects associated with a computing session. In particular, software on the portable device will automatically execute on the host computing device after the host computing device recognizes the presence of the portable device. The software provides instructions for the host computing device to launch a select program on the host computing device and provide a customized configuration for the program. The customized configuration is based on information stored on the portable device. As such, the portable device may automatically set preferred interface or program configurations personalized to the user. For example, the interface settings for a desktop, productivity, or browser application may be tailored as defined by information stored on the portable device. Other settings, such as bookmarks for a browser, may be stored on the portable device and made available to the program launched on the host computing device.

32 Claims, 6 Drawing Sheets

U.S. PATENT DOCUMENTS

| | | | | |
|---|---|---|---|---|
| 5,777,903 A | * | 7/1998 | Piosenka et al. | 708/100 |
| 5,781,723 A | | 7/1998 | Yee et al. | 713/200 |
| 5,799,168 A | | 8/1998 | Ban | 395/430 |
| 5,937,425 A | | 8/1999 | Ban | 711/103 |
| 5,954,808 A | * | 9/1999 | Paul | 710/104 |
| 5,960,085 A | | 9/1999 | de la Huerga | 380/25 |
| 5,987,612 A | * | 11/1999 | Takagawa et al. | 713/201 |
| 6,088,802 A | | 7/2000 | Bialick et al. | 713/200 |
| 6,095,412 A | | 8/2000 | Bertina et al. | 235/380 |
| 6,101,482 A | | 8/2000 | DiAngelo et al. | 705/26 |
| 6,101,483 A | | 8/2000 | Petrovich et al. | 705/26 |
| 6,148,354 A | | 11/2000 | Ban et al. | 710/102 |
| 6,199,114 B1 | * | 3/2001 | White et al. | 709/229 |
| 6,282,522 B1 | | 8/2001 | Davis et al. | 705/41 |
| 6,334,216 B1 | * | 12/2001 | Barth | 725/30 |
| 6,385,729 B1 | | 5/2002 | DiGiorgio et al. | 713/201 |
| 6,397,224 B1 | | 5/2002 | Zubeldia et al. | 707/102 |
| 6,425,084 B1 | | 7/2002 | Rallis et al. | 713/185 |
| 6,434,530 B1 | | 8/2002 | Sloane et al. | 705/1 |
| 6,453,342 B1 | * | 9/2002 | Himmel et al. | 709/213 |
| 6,460,076 B1 | * | 10/2002 | Srinivasan | 709/219 |
| 6,481,621 B1 | | 11/2002 | Herrendoerfer et al. | 235/380 |
| 6,550,672 B1 | | 4/2003 | Tracy et al. | 235/383 |
| 6,567,915 B1 | | 5/2003 | Guthery | 713/168 |
| 6,581,072 B1 | | 6/2003 | Mathur et al. | 707/104.1 |
| 6,609,113 B1 | | 8/2003 | O'Leary et al. | 705/39 |
| 6,738,901 B1 | * | 5/2004 | Boyles et al. | 713/159 |
| 6,792,464 B2 | | 9/2004 | Hendrick | 709/227 |
| 6,871,213 B1 | * | 3/2005 | Graham et al. | 709/205 |
| 2002/0052806 A1 | | 5/2002 | Hodson et al. | 705/27 |

* cited by examiner

PORTABLE MEMORY DEVICE INCLUDES SOFTWARE PROGRAM FOR INTERACTING WITH HOST COMPUTING DEVICE TO PROVIDE A CUSTOMIZED CONFIGURATION FOR THE PROGRAM

This application claims the benefit of provisional application serial No. 60/243,816, filed Oct. 27, 2000, entitled PORTABLE PRIVACY AND CONFIGURATION FOR COMPUTER AND WEB BASED APPLICATIONS, the disclosure of which is incorporated herein by reference.

FIELD OF THE INVENTION

The present invention relates to portable devices to facilitate computing, and in particular, relates to a portable device capable of interacting with a computing device to facilitate user interaction.

BACKGROUND OF THE INVENTION

Using multiple computers and multiple computing devices is becoming commonplace. The need or desire for people to use more than one computer in addition to mobile computing devices, such as personal digital assistants (PDAs) and mobile telephones accessing the Internet, is increasing for private and business use. These users frequently access the Internet and demand customization of their computing environments. For example, most users customize their desktop and browser settings to provide a friendly interface as well as make favorite web pages readily accessible with organized bookmark settings. Unfortunately, such settings configured on one computing device are not readily portable to other computing devices. The other computing devices typically require replicating configuration information to arrive at the preferred settings that are frequently used. Although users that interact with different computing devices on a routine basis would often benefit from having customized settings available on each device, the limited use on any one computing device does not outweigh the time and effort necessary for customization. When a user accesses the web from a public or shared host system, the web browser does not contain a user's setup and preferences, but rather those of the host system. In addition, shared access may compromise the privacy of the owner of the system as well as that of the user.

The increase in mobile computing also corresponds to concerns about privacy. Administrators of computing devices want to make sure that users are authorized to use the computer and control access to the various programs and data available from the computer. Second, users would like the freedom to use computing devices as desired without leaving readily accessible records of their activities, which are available by viewing cookies, computing or browsing histories, and the like.

As such, there is a need for a way to provide portability of customization options and settings to optimize interactions on multiple computing devices. There is a further need to address the privacy and security issues associated with computing on multiple computing devices on commercial and personal levels.

SUMMARY OF THE INVENTION

The present invention relates to a portable device configured to interact with a number of host computing devices. The portable device primarily includes memory having software capable of running on one of the host computing devices. The memory will be associated with an interface to facilitate interaction with one or more of the host computing devices. Although the portable device is primarily a memory device, the portable memory device may include control circuitry to assist in interaction with the host computing devices as well as organizing the data stored thereon.

The present invention uses a portable memory device to directly or wirelessly interact with one or more host computing devices to provide a customized configuration for one or more aspects associated with a computing session. In particular, software on the portable device will automatically execute on the host computing device after the host computing device recognizes the presence of the portable device. The software provides instructions for the host computing device to launch a select program on the host computing device and provide a customized configuration for the program. The customized configuration is based on information stored on the portable device. As such, the portable device may automatically set preferred interface or program configurations personalized to the user. For example, the interface settings for a desktop, productivity, or browser application may be tailored as defined by information stored on the portable device. Other settings, such as bookmarks for a browser, may be stored on the portable device and made available to the program launched on the host computing device.

Preferably, the portable computing device will emulate a file system in memory of the host computing device, such as a hard disk drive, wherein the software and data appear as a file system or other memory available to the host computing device. The portable device may interact with the host computing device through a direct or wireless interface. Preferably, most of the information provided on or by the portable device is encrypted to enhance security. Data compression techniques are available to maximize the amount of information capable of being stored on the portable device.

In addition to customizing select programs launched on the host computing device, the present invention may provide an authentication procedure. Authentication may include receiving authentication indicia from the user via an interface on the host computing device and determining if the authentication information received from the user matches authentication indicia stored on the portable device. As such, protection is provided to prevent non-authorized users from using the portable device. The portable device may also be configured to remove remnants or records of user interaction during a computing session from the host computing device to enhance the privacy associated with the computing session.

The present invention may be implemented on numerous types of portable devices as well as in software provided on a computer readable medium, such as a compact disk, floppy disk, or the like, capable of being provided to or stored on the portable device according to the present invention.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the specification illustrate several aspects of the invention, and together with the description serve to explain the principles of the invention.

DETAILED DESCRIPTION OF THE PREFERRED EMBODIMENTS

The present invention provides a portable memory device capable of interfacing with a number of computing devices. The portable memory device, referred to generally as a key, is preferably configured to provide one or more applications capable of running on a computing device, generally referred to as a host, to facilitate user interaction. Preferably, the user interaction is embraced with one or more privacy and security measures.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these applications and concepts fall within the scope of this disclosure and the accompanying claims.

Figure 1:
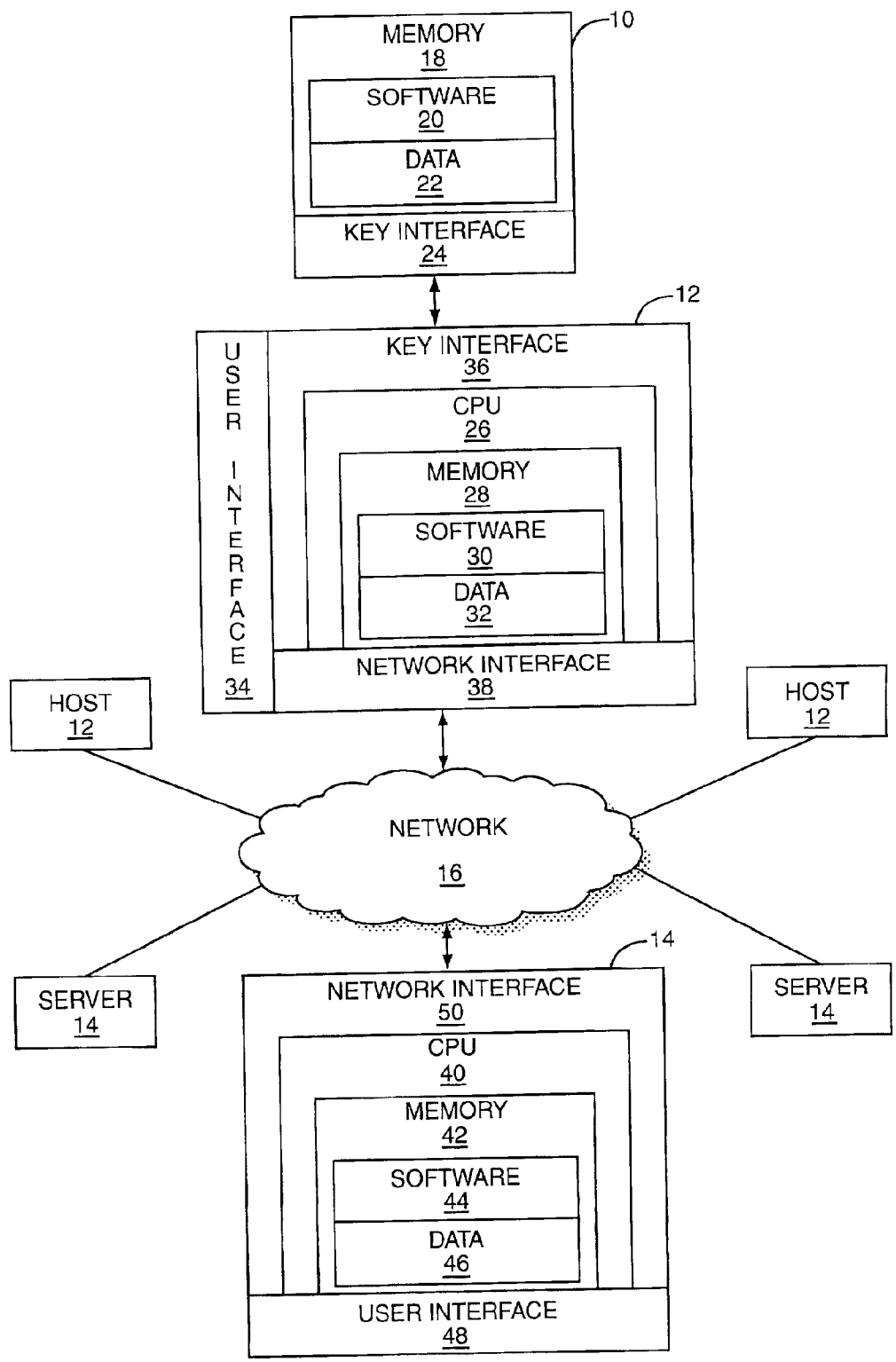
FIG. 1 is an illustration of a computing environment compatible with the operation of the present invention.

With reference to FIG. 1, a basic representation of a computing environment consistent with the implementation of the present invention is illustrated. At the heart of the invention is the portable memory device, which is referred to as a key 10. The key 10 is configured to interact with any number of computing devices, which are referred to as hosts 12. Each host 12 will typically interact with one or more servers 14 via a network 16, which may include a local area network (LAN), the Internet, or a combination thereof.

The key 10 will primarily include memory 18 having software 20 capable of running on one of the hosts 12, and data 22. The memory 18 will be associated with a key interface 24 to facilitate an interface with one or more of the hosts 12. Although the key 10 is primarily a memory device, the key may include control circuitry to assist in interaction with the host as well as organizing the data 22. Preferably, once an interaction between the key 10 and a host 12 is established, the memory 18 will emulate a file system on a memory device, such as a hard disk drive, accessible by the host 12 wherein at least certain aspects of the software 20 are capable of running or executing on the host 12.

In the preferred embodiment, the key 10 will include four or more megabytes of flash memory and a built-in USB sleeve interface. When the key 10 is plugged into a USB port of a host 12, the key 10 will emulate a file system on a solid state mass storage device, and via plug-and-play functionality, rely on device drivers that are typically associated with the host's operating system. The key 10 is preferably configured for autorun capability, which may emulate that of a CD-ROM autorun configuration. This configuration will allow a start-up application stored on the key 10 to start executing when the key 10 is plugged in to the USB port of the host 12. Those skilled in the art will recognize a variety of configurations for the key 10 wherein when the key 10 is placed into or associated with the host 12, one or more applications are automatically executed by the host 12. The organization of the memory 18 will preferably resemble a file structure addressable by the host 12. Preferably, the software 20 will include Java applets, Active-X components, or the like capable of automatically running on the host 12 upon engaging the key 10 with the host 12, or otherwise establishing an interaction between the two devices. Additional detail is provided below.

The host 12 may take many forms, including a personal computer (PC), workstation, personal digital assistant (PDA), notebook computer, web-enabled mobile telephone, or the like. The host 12, regardless of form, will typically include a central processing unit (CPU) 26 associated with memory 28 having the requisite software 30 and data 32 for operation. Typically, a user interface 34 is provided to facilitate interaction with the host's user, which is preferably the owner of the key 10, who is interacting with the host 12. The CPU 26 is preferably associated with a key interface 36 to facilitate interaction with the key 10, and a network interface 38 to facilitate interaction with any number of devices associated with network 16, such as the servers 14.

Importantly, the software 20 on the key 10 is configured to readily execute on the host 12 upon interface. For example, the key 10 may be compatible with Windows plug-and-play capability, and the key interface 24 may be USB compatible, wherein when the key 10 is plugged into the key interface 36 of the host 12, the host 12 will recognize the key 10 and execute select applications or functions provided by the software 20 of the key 10.

The host 12 is preferably configured to access various servers 14 over the network 16 upon executing applications or functions of the key 10. These servers 14 may be configured in any number of ways. The servers 14 may be traditional application servers facilitating the function of the host 12, or may be web servers capable of downloading markup language content upon request from a browser running on the host 12.

The server 14 will typically include a CPU 40 having memory 42 with the requisite software 44 and data 46 to facilitate operation. The server 14 will typically include a user interface 48 and a network interface 50 cooperating with the CPU 40. The user interface 48 allows a direct interface with the server 14, wherein the network interface 50 facilitates interaction with any number of network devices, including other servers 14 and hosts 12.

Figure 2A:
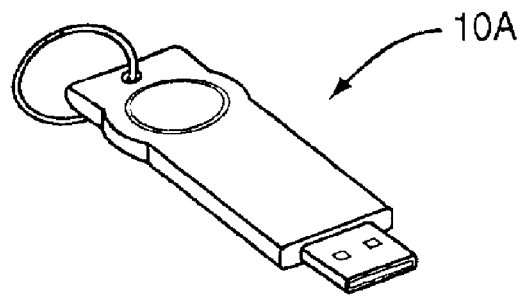
FIG. 2A illustrates a portable key that is capable of being inserted into and interacting with multiple computing devices according to the present invention.
Figure 2B:
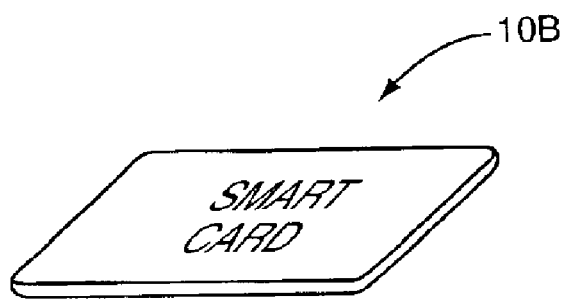
FIG. 2B is a smart card configured to interact with multiple computing devices according to the present invention.
Figure 2C:
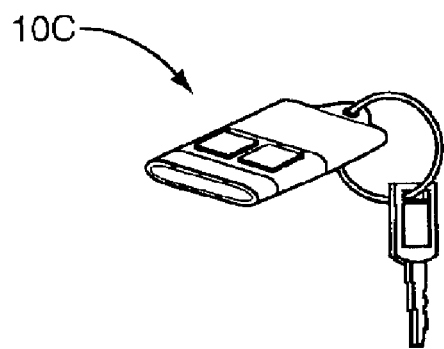
FIG. 2C is a remote communication device, such as a transponder, configured to interact with multiple computing devices according to the present invention.

Turning now to FIGS. 2A–2C, the key 10 may take on any number of configurations. The preferred embodiment is shown in FIG. 2A wherein the key 10 takes the form of a physical key-like device 10A capable of being plugged into a USB port or other readily accessible port on the host 12. Preferably, the key 10A is light and portable enough to be carried on a key chain or the like. FIG. 2B represents a smart card 10B capable of carrying out the concepts of the present invention. The smart card 10B may be a contact-based or a contactless (wireless) smart card 10B capable of interacting with the host 12 as described above. FIG. 2C depicts a wireless communication device 10C, such as a transponder, capable of facilitating wireless communications with the host 12. Whereas a physical connection with a key 10 may implement the Windows plug-and-play interface, a wireless device 10C may incorporate an automatic detection or sensing technology, such as the discovery process used by Bluetooth, which is well documented and available to those skilled in the art. The key 10 may also be implemented in a wireless personal digital assistant (PDA), mobile terminal, such as a mobile telephone, or like portable computing device. The applications or functions stored on the key 10 and capable of executing on the host 12 are referred to in general as keylets. As discussed below, keylets may also reside on a host system itself, depending on the security level associated with that host 12. Typically, keylets are assigned a class indicating the basic functionality of the keylet, and preferably a security level corresponding to the functionality of the keylet. The keylets are preferably Java applets, but may incorporate any software technology facilitating ready execution on a host 12. The keylets may provide any number of functions, several of which are discussed in detail below.

Figure 3A:
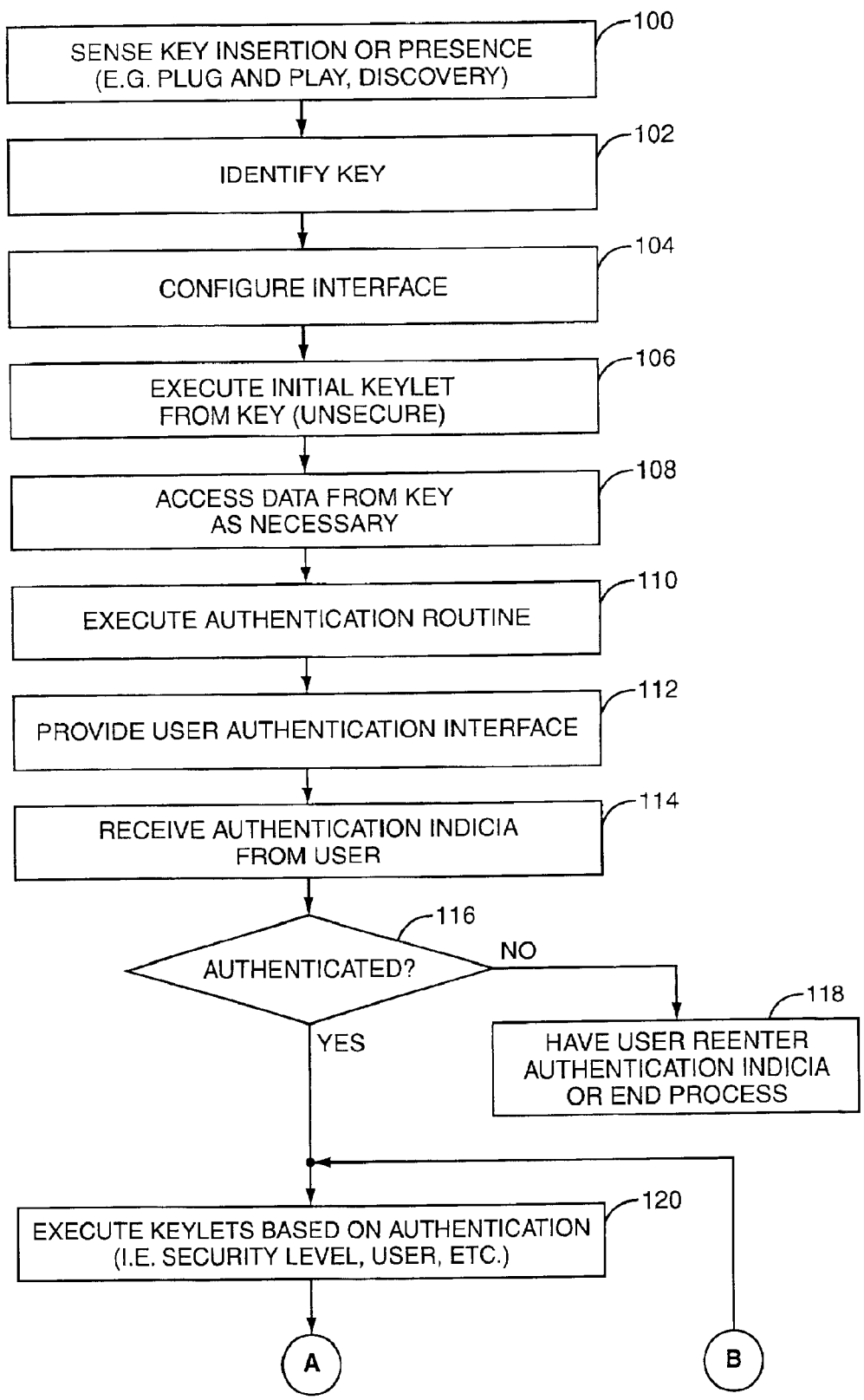
FIGS. 3A and 3B are a flow chart outlining a basic process for interacting with multiple computing devices according to the present invention.
Figure 3B:
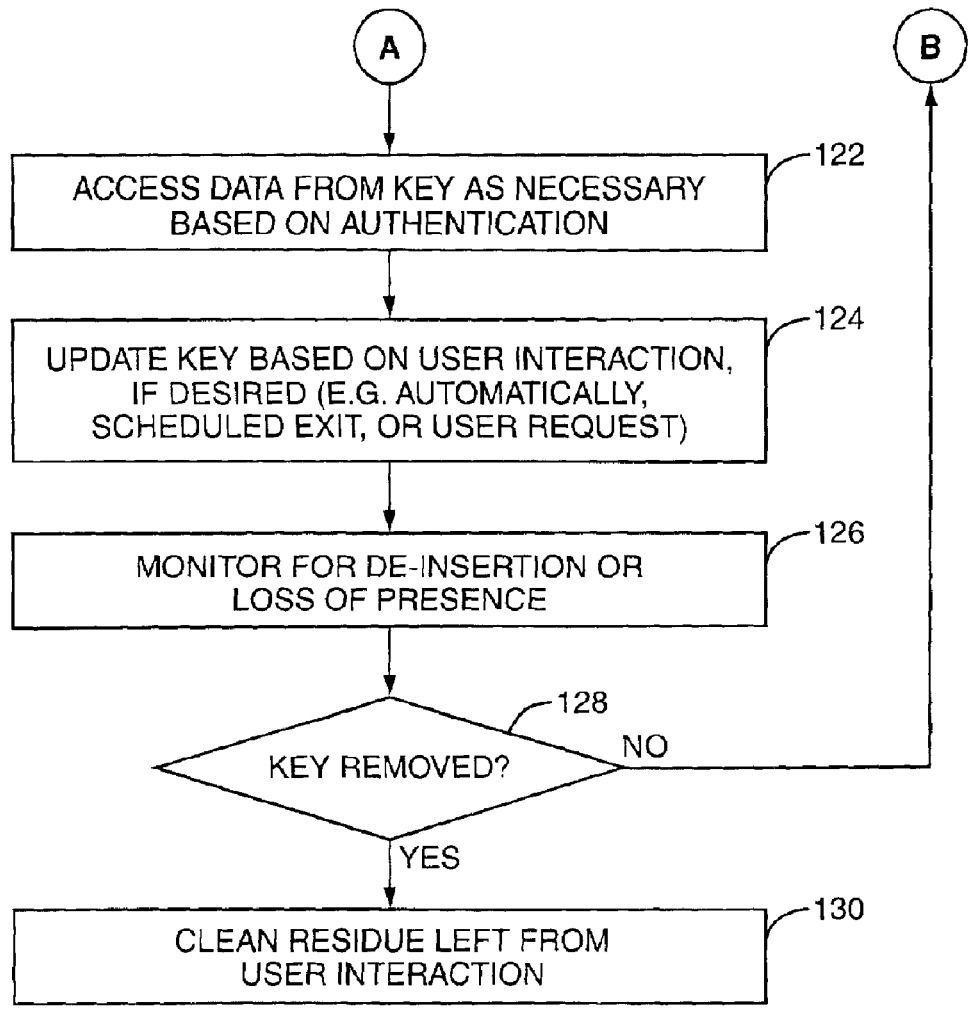

A generic process providing multiple functions is outlined in the flowchart of FIGS. 3A and 3B, wherein user authentication is required before a certain function or interaction is allowed by the host 12. Further, upon completion or termination of the interaction or function, remnants indicative of the user's interaction are removed from the host 12 to facilitate privacy.

The process begins when the key 10 is inserted into or placed within communication range of the host 12 (block 100). Preferably, the key 10 is identified (block 102) and the communication interface is configured to facilitate interaction (block 104). One of the keylets may be programmed to configure the user's desktop and basic interface features. For example, the user may have a keylet configured to set preferred color schemes for the desktop, provide a select screen saver after a certain period of dormancy, or activate a particular application. For example, the user may want a light green desktop with a screen saver using a favorite wallpaper after ten minutes of dormancy. Further, the user may have the keylet automatically configure Microsoft Outlook to check e-mail from a select pop email server, as well as launch Microsoft Word and Excel. The keylet may launch Word and Excel to have the user's favorite toolbars and settings. Internet Explorer or other browser may be launched with bookmarks stored on the portable device. This type of functionality is available on any host 12 capable of interacting with the key 10. Preferably, the key 10 is configured to be readily operable with any number of computing devices acting as host 12.

Regardless of the function provided, a specific keylet is typically configured to initially execute on the host 12 (block 106). Generally, the initial keylet to execute is a basic keylet requiring little or no security to execute. The execution of the keylet may require access to data stored on the key (block 108).

In this example, the initial keylet runs an authentication routine to ensure that the holder of the key 10 is authorized to use the key 10 in association with the host 12 (block 110). Typically, the authentication routine will provide a user authentication interface (block 112) requiring a password, logon information, or biometric indicia from a biometric reader (not shown) associated with the host 12. In response, the user will provide authentication indicia to the host 12. The authentication routine, which is running on the host 12, will receive the authentication indicia from the user (block 114), and determine if the user is authenticated (block 116).

If the authentication indicia does not match that stored on the key 10 or otherwise associated with the authentication routine (block 116), the keylet may have the user re-enter the authentication data, or may simply end the process (block 118). If the user is authenticated (block 116), one or more additional keylets based on the user authentication are executed according to the interaction of the user (block 120). Notably, as will be discussed in further detail below, the keylets available for use may be based on a security level corresponding to the authentication.

During execution of any of the keylets, data may be accessed from the key 10 as necessary based on the keylet and the authentication or security level (block 122). Further, the data 22 stored on the key 10 may be updated based on the user interaction as desired (block 124). The user may also be queried to update data 22 on the key 10. Alternatively, keylets may be configured to automatically update the key 10 without informing the user. Those skilled in the art will recognize the various options capable of being provided to the user.

Depending on the keylet being executed, the user may indicate a desire to end the session, wherein the keylets or data involved in the interaction may be updated as necessary. Throughout this process, one or more of the keylets may monitor for the insertion or loss of presence of the key 10 (block 126). If the key 10 is not removed (block 128), the process will repeat. If the key has been removed (block 128), one or more of the keylets will preferably continue to run on the host to clean any residue left from the user interaction (block 130). Cleansing the residue from the host 12 will preferably include removing any cookies, histories, information in cache, or other memory indicative of the user's interaction. Such a cleansing is also preferable upon a scheduled termination of the session, wherein the cleansing will occur upon the user signaling for an end of the interaction. The automatic cleansing upon removal of the key 10 is a safeguard for those forgetting to properly end the session and simply removing the key 10 without providing the host 12 forewarning.

In the preferred embodiment, the key 10 will include multiple keylets providing various functions. The keylets may have access to common data files or select, corresponding data files. An exemplary architecture is provided in FIG. 4 for the key 10 and a server 14 configured to interact with select ones of the keylets while operating on the host 12. For purposes of illustration, three keylets are illustrated: auxiliary keylets 52, core keylets 54, and web keylets 56. Each of the keylets preferably interacts with a key manager (KM) application 58 capable of managing interaction among keylets and between keylets and associated data files: auxiliary data files 60, core data files 62, and web data files 64. Depending on the functionality of the keylets and the business models for marketing keys 10 having the various keylets, the core keylets may be provided by the provider or manufacturer of the key 10. The web keylets 56 are particularly configured for interaction with one or more servers 14 when the keylets are executed on the host 12.

As illustrated, the server architecture may include web servlets 66 configured to facilitate interaction between the web keylets 56 and the web servlets 66 running on server 14 via the network 16. Notably, servlets 66 are similar to keylets, with the exception that they are stored and run on the server 14. Notably, any of the keylets 52, 54, 56 may provide any type of functionality, and are only illustrated as being different for the purposes of description. As such, the auxiliary keylets 52 may be provided by business partners associated with the providers or makers of the key 10. The core keylets 54 may provide functionality basic to the core elements of the key 10, wherein the auxiliary keylets 52 may provide functionality corresponding to a particular function associated with the given business. The auxiliary, core, and web data files 60, 62, 64 are preferably used to store data used or provided by the auxiliary, core, and web keylets 52, 54, 56, respectively. Preferably, the keylets use compression and encryption techniques to minimize the impact on memory as well as to provide secure transfer of data between the executing keylets and the various data files 22 stored on the key 10.

The key manager 58 may also provide various levels of security for keylets and data files. For example, an initial security level may allow access only to select data files and keylets, whereas an authorization corresponding to a higher-level security may provide access to all of the data files and use of all of the keylets. Further examples of security levels and use of security are described in greater detail below in association with particular keylets.

The server architecture may include any number of servlets or services, such as the core services 68 or third party services 70. The core services 68 may correspond to the basic functionality of key interaction and use, wherein the third party services 70 may correspond to a business partner's application configured to run in association with the use of a key 10. Typically, the key manager 58 will interact with the various keylets using a key manager application program interface (API) 72, wherein the servlets and services may interact with each other through an extended API 74. The types of keylets available are limited only to the types of functionality required of the key 10. Further, multiple functions may be provided in a single keylet, or provided in a corresponding number of keylets, wherein one function corresponds to one keylet. The following outlines numerous functions that may be provided by keylets individually or in combination.

The authentication function is a security feature that provides for user authentication when accessing a host 12 or services on the host 12. To access the authentication function, the user must engage the key 10 with the host 12 by actually plugging the key 10 into the host 12, or by placing the key 10 within a certain proximity to the host 12 (wireless). Once the host 12 recognizes the key 10 and executes a keylet providing the authentication function, the user is preferably queried to enter a user name and password. Once entered, the keylet will confirm or deny the user name and password entered by the user with information stored, and preferably encrypted, on the key 10. Assuming that the user name and password are authenticated, access to at least a portion of the services provided by the key 10, and perhaps by the host 12, are authorized. Different passwords and user names may be used in various combinations to access various levels of security and may be provided by the key 10. The authentication function is particularly useful when combined with other functions provided in the same or different keylets.

A second function made possible by the present invention relates to private and secure Internet access on multiple hosts 12. When a user normally accesses the Internet from a public or shared host system, the host's web browser does not contain the user's normal setup and preferences found on the user's home PC, but rather those of the host 12 being used. In addition, shared access may compromise the privacy of the owner of the host system as well as that of the user.

With the present function, upon interaction of the key 10 with the host 12, a "private" web browser is launched from the host 12 upon execution of the keylet providing the function. Preferably, the keylet launches the web browser on the host and causes the web browser to fetch select information relating to desired settings, preferences, bookmarks, and the like, from the key 10, thereby protecting the security and privacy of both the owner and the user of the system, while allowing the user to apply his preferences and information for the browsing event. As noted above, when the user removes the key 10 or otherwise disassociates the key 10 from the host 12, the same or other keylet will close the browser, and the temporary environment established for the browsing session will be cleaned without leaving any traces such as history, cookies, cache, preferences, etc. The keylet will also close itself, and preferably operate to completely remove the keylet, or leave the keylet in such a state that it is readily erased upon restart or minimized to the point where information is unavailable from analyzing the keylet.

Figure 5:
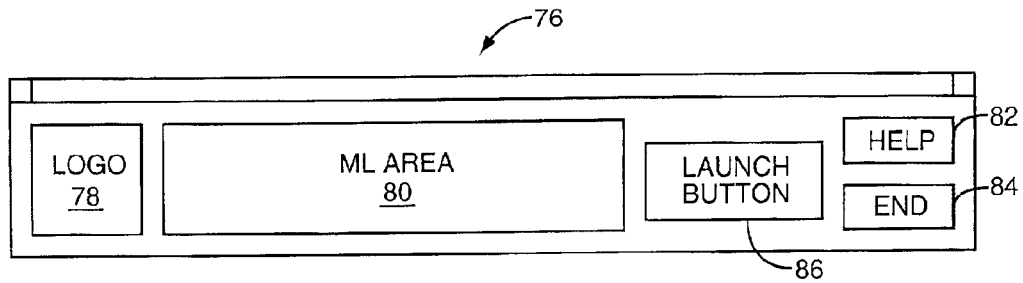
FIG. 5 illustrates an exemplary launching bar provided by the present invention.

Another unique function provided by executing a particular keylet on a host 12 provides for a launching an interface bar, referred to as a launching bar, with advertising content as well as a way to access other functions provided by one or more keylets on the key 10. A launching bar, generally referred to as 76, is depicted in FIG. 5. Preferably, the launching bar 76 will appear as or will be closely associated with the web browser's tool bar and advertising banner.

Although the Internet provides tremendous opportunity for advertising, there is a need to increase customer retention by holding advertising content provided on the browser's advertising banner for a period of time sufficient for the user to actually view the advertising, instead of catching only a glimpse while navigating from one web page to another. Preferably, when a "private" web browser session is started as described above, the session will start with a narrow, fixed markup language frame, as depicted in FIG. 5. The frame may take many forms and may associate itself with the toolbar or banner of the web browser, or may actually act as a mini-web page, positioned anywhere on the screen. Preferably, the frame is configured to override or otherwise conceal or hide the advertising normally provided by the web browser or page being displayed. The frame may include any elements compatible with the markup language being used, such as GIFs, links, buttons, banners, text, animation, etc.

As depicted, the launching bar 76 may include a logo 78, a markup language (ML) content area 80, a help button 82, an end button 84, and a launch button 86. Preferably, the launching bar 76 will redirect uniform resource locators (URLs) and other web page content through the launching bar 76, so as not to interfere with the content intended to be displayed to the user or functional buttons and drop-down menus provided by the browser. Preferably, the launching bar 76 will provide advertising information associated with the provider of the key 10. As such, the logo area 78 may include a fixed logo for a company. Notably, the logo remains in place throughout a browsing session wherein the user is browsing any number of pages. The markup language content area 80 may include fixed information provided by the key 10, select information provided as a web page from any one of the servers 14, or a combination thereof. Importantly, the content provided in the markup language content area 80 may come from a select web page dictated by information provided in the key 10 and independent of the actual web page selected by the user. As such, the provider of the key 10 has multiple opportunities to provide advertising information to the user during a browsing session, even when the user is skipping from one page to another.

The launching bar 76 may act as an interface to the various functions provided by the keylets on the key 10. For example, clicking on or otherwise selecting the help button 82 may invoke a help keylet capable of accessing help information stored on the key 10. Similarly, the end button 84 will act to close the launching bar 76, and preferably, initiate a cleansing function to remove traces of the user's interaction during the browsing or computing session.

Typically, the logo area 78 contains a button displaying the logo of a business. When the button is clicked, the web page of the business being advertised is launched. The markup language area 80 may contain a banner, image, or hyperlink associated with a keylet, service, or servlet. The markup language area 80 be associated with or facilitate the functionality of a browser. Preferably, clicking on this area will enable a content push, which is described below in greater detail. In the preferred embodiment, the launch button 86 is the only way to launch the various keylets in order to provide maximum marketing and advertising benefit of the launching bar 76. Those skilled in the art will recognize numerous ways to execute keylets and that the launching of keylets need not be limited to this preferred mode. When the end button 84 is selected, the keylet controlling the launching bar 76 will preferably terminate and end the user session as it is associated with the key 10. At this time, or when the key 10 is removed from the host system 12, the launching bar keylet or associated clean-up keylet will clear the markup language area 80 and replace it with a notification that the key 10 has been removed and key termination is in progress.

Figure 6:
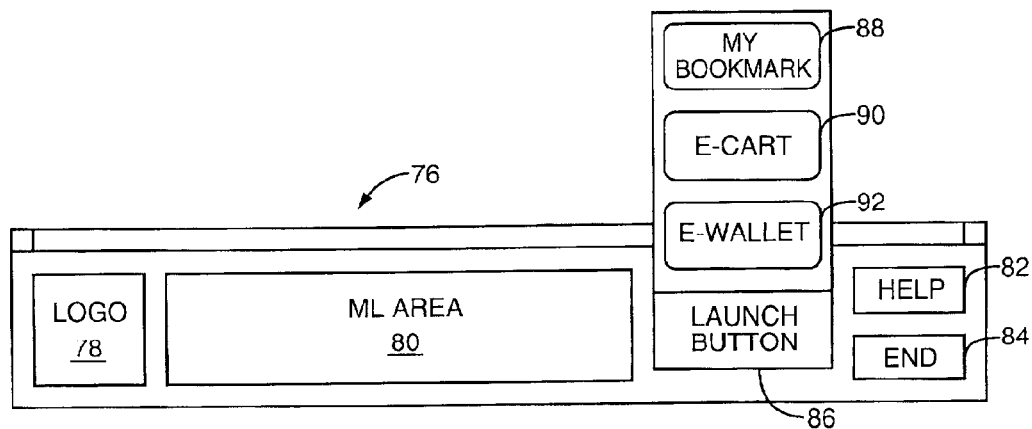
FIG. 6 represents an expansion window associated with the launching bar illustrated in FIG. 5.

The launch button 86 may be configured in a number of ways. The launch button 86 may be used to simply elect a function provided by one or more of the keylets or provide a selection window upon activation to display the various functions available to the user. A selection window associated with the launching bar 76 is shown in FIG. 6, wherein upon selection of the launch button 86, a function menu is provided including a selection for "My Bookmark" 88, "E-Cart" 90, and "E-Wallet" 92. As such, the launching bar 76 may provide a user interface to the functions provided by the key 10 as well as the fixed advertising medium to hold advertising information or select advertising information independent of the web page selected by the user.

Another function of the present invention that is capable of being provided by executing an appropriate keylet on the host 12 operates to manage passwords for web-based services. Typically, web users are registered at multiple web-based services. Some choose to register by different user names and passwords; consequently, they often have difficulties recalling their user names and passwords. Many others solve these problems by reusing the same user name and password combinations across multiple sites and services, which creates a risky security exposure.

The passwords manager function is preferably a Java applet that allows a convenient way for a user to store his user name and password in an encrypted form on the key 10. When the user accesses a web site that requires authentication or the entry of a password, the passwords manager will preferably automatically recognize the site and the need for insertion of a user name and password and will actually insert the user name and password in the appropriate fields on the web page.

The passwords manager function may automatically fill in the requisite information upon entry of the page requiring the information, or may only provide the information upon command by the user. Preferably, the passwords manager will automatically recognize entry into a particular site, and automatically fill in the user name and password fields in a fashion eliminating steps by the user. Preferably, the user name and password are automatically filled in the appropriate fields in a fashion taking the user directly into the site by requesting the subsequent web page.

Alternatively, the keylet providing the password manager function may directly cooperate with the web servlets 66 via the network 16 to facilitate the same or similar functionality. In this case, the web servlet 66 will be specially configured to interact with the particular keylets to provide the functionality, instead of the keylet taking the sole responsibility for detecting the web page and filling in the requisite information.

Notably, the passwords are not relegated to merely user name and password configurations, those skilled in the art will recognize that various types of password configurations are used for logging into web-based services. Further, the authentication function described above is particularly useful in combination with the passwords manager to ensure that only authorized users may have their user names and passwords automatically filled in the appropriate fields when accessing a particular web site.

The passwords manager function will preferably allow tracking, updating, and changing passwords for any given web page or service. Further, the passwords manager function may be combined with other functions, for example, upon activating a service from the launching bar 76, one or more keylets may execute to enter the web site and automatically fill in user name and password fields. Further, this functionality may be allowed only if the user was properly authenticated.

Another issue facing users is that built-in bookmark tools on browsers require users to classify their bookmarks in a hierarchical structure. The hierarchy is typically not a natural organizational method, and can pose difficulties when the same site being bookmarked can be associated with multiple categories. For example, Amazon.com is a shopping site for both music and books, and should be classified under both categories.

The present invention provides a bookmark manager that readily allows classification of a common URL under multiple keywords identifying categories. Further, a graphical user interface may be provided, wherein new categories may be added and URLs may be associated with any number of categories. Thus, when a user selects a certain keyword, all of the URLs associated with that category may be displayed. A more basic function for the bookmark manager is to simply make the various user bookmarks available for any browsing session.

Preferably, the browser launched for the session will incorporate all the bookmarks and organization thereof from the key 10 instead of those stored on the host 12. If the bookmarks are changed, new bookmarks added, or old bookmarks deleted during the session, the key 10 will be updated so that the new configuration is available for the user's next session on the same or other host 12. The bookmark manager function may cooperate with the password manager such that when a website associated with a particular bookmark is accessed, the user name and password are automatically entered in the appropriate fields to quickly propel the user into the web site associated with the bookmark. Further, these functions may be affiliated with other keylets, such as an authentication keylet, and may be provided on the launching bar 76 directly or in association with the launch button 86.

Another aspect of the present invention allows for efficient use and security for managing various financial account numbers used online. According to a study by Visa, approximately 27% of online shoppers leave their shopping carts behind at the stage when they are asked to fill out a form with credit card and shipping information. Users have security concerns and limited patience for filling out long payment and shipping forms. The present invention includes aspects that allow users to store in the key 10 information for one or more financial accounts, such as credit and debit card account numbers, billing addresses, and multiple shipping destination addresses. Preferably, this information is encrypted and protected in the user's key 10.

When the user needs to fill out payment and shipping forms at an e-commerce site, the key 10 will or will have authenticated the user as described above and the user will be prompted via a graphical user interface to select a particular account number, and perhaps shipping and billing addresses, to use. A credit card manager function will then decrypt the information and fill out the appropriate fields in the web page, or alternatively, send the encrypted information directly to an e-commerce site for bill processing. In the latter case, the particular keylet providing the function may cooperate with a web servlet 66 specially configured to interact with the keylet to provide processing of the account information, and perhaps, decryption of the encrypted information. Preferably, the keylet or keylets providing the account manager are compatible with the electronic commerce modeling language (ECML) standard. The keylet may allow the user to paste entries into non-ECML fields by a menu of buttons that correspond to the full repertoire defined by the ECML standard.

Preferably, the keylet will allow users to keep track of various account numbers and any associated security for a variety of accounts. Passwords for the accounts and the like may also be stored and automatically used during this transaction directly in association with a function or in combination with other functions provided in the same or other keylets. In essence, the account manager will manage multiple financial accounts, facilitate filling in forms for checkout, and aid in providing a secure transaction for the user in a fast and efficient manner.

Another function of the present invention capable of enhancing user convenience as well as facilitating e-commerce is the portable shopping cart function. The portable shopping cart function provides a shopping cart available for one or more e-commerce sites, wherein the shopping cart is actually kept on the key 10 between shopping sessions. Information relating to products selected to place in a shopping cart for one or more sites is kept on the key 10, wherein when the user revisits a site, the shopping cart is available. The shopping cart may be site-specific wherein items placed in a cart for a particular site are only available for that particular site.

Alternatively, the shopping cart may be configured to work with multiple e-commerce sites. For example, basic product information from Amazon.com, Borders.com, and BarnesandNoble.com may be used to identify one or more items, wherein items selected to place in a shopping cart at one site may be available for comparison or purchase via another site. The products may be identified in the shopping cart based on proprietary item numbers, universal product codes (UPCs), or sufficiently descriptive information, such as the title in combination with the artist or author.

In general, the keylets will be configured to interact with a web page and act as the shopping cart for the site or otherwise interact with the shopping cart to automatically provide or receive information therefrom. The interaction depends on whether the user is bringing a shopping cart with items to a site or leaving a site with items yet to be purchased. As with the above, the shopping cart function may be combined with any of the various functions. For example, if the user is shopping online, one or more keylets may be configured to provide a shopping cart for the products to purchase, fill in an account number, and provide passwords for the account, the shopping cart, and online retailer. The shopping cart may be updated during shopping and used to store products between shopping sessions. Further, the user may be authenticated as described above before allowing any interaction.

An expansion of these concepts can be applied to marketing between brick-and-mortar stores and online shopping sites. Cross-promotion selling is provided by allowing a user to gather information from a brick-and-mortar computer terminal or other host 12 and use the information online, and vice versa. As such, online retailers can encourage users to visit the corresponding brick-and-mortar stores, while traditional retailers can encourage users to visit certain online sites. All of these functions may be provided with varying levels of security, compression, and encryption.

Additional functions may allow the storage and protection of unique coupons and tokens on the key 10. The coupons may have a time expiration, number of uses, or a transferability flag to enhance marketing. The coupons may be used in conjunction with any of the functions above to facilitate shopping and e-commerce.

Figure 4:
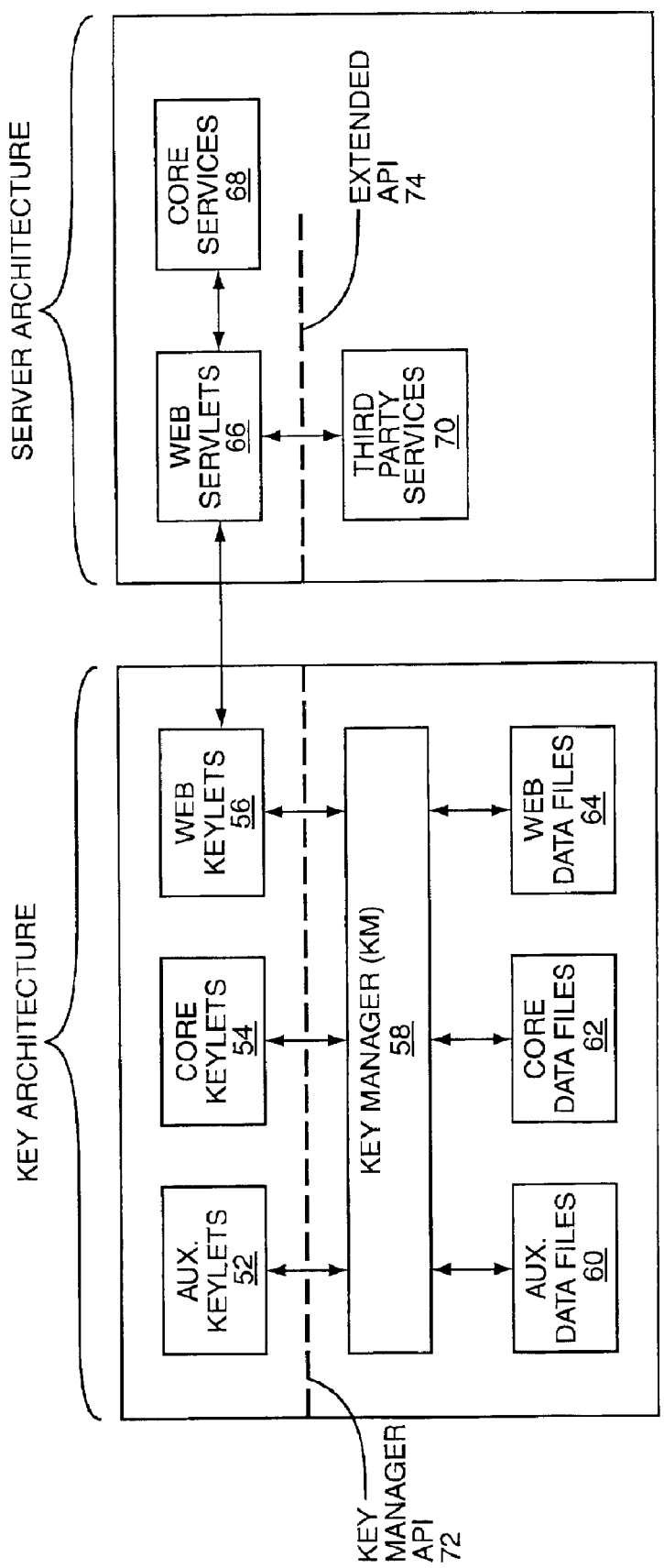
FIG. 4 illustrates a software architecture according to a preferred embodiment of the present invention.
Figure 7:
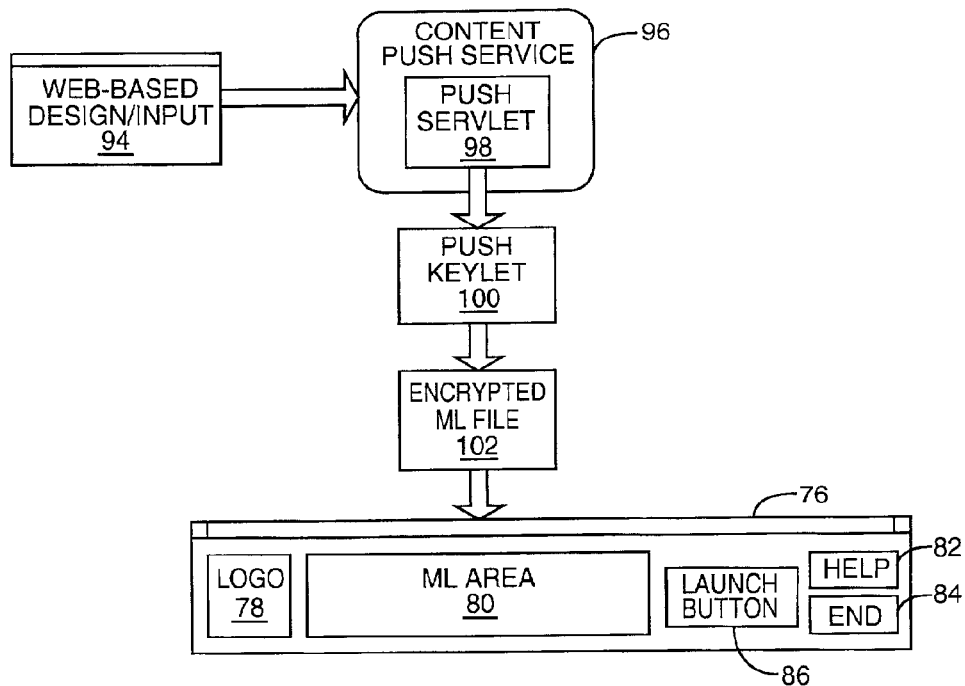
FIG. 7 illustrates a preferred service providing a content push for the markup language area of the launching bar illustrated in FIG. 5.

A content push service is preferably used to fill the markup language area 80 of the launching bar 76. As illustrated in FIG. 7, a keylet running on the host 12 will cooperate with a servlet running on the server 14 to automatically load content in the markup language area 80. Preferably, web-based input 94 is provided to a content push service 96 associated with a push servlet 98 running on the server 14. The push servlet 98 is preferably a web servlet 66 as previously described in FIG. 4. The push servlet 98 will cooperate with a push keylet 100 being executed on the host 12. The push keylet 100 may be a web keylet 56 as illustrated in FIG. 4. The push servlet 98 and push keylet 100 will cooperate to push the content of a markup language file 102 to the markup language area 80 of the launching bar 76. As illustrated, the markup language file 102, as with most of the files processed in association with the key 10, is preferably encrypted for enhanced security. Using the content push service 96 allows the markup language area 80 of the launching bar 76 to be updated using different types of content. However, the content is provided by a specified source associated with the key 10 in lieu of the content simply being associated with whatever web page is being viewed by the user.

Since the present invention provides numerous possible functions and combinations thereof, the preferred embodiment of the present invention uses the key manager 58 (as shown in FIG. 4) to manage the interaction and overall relationship between the various keylets providing their respective functions. Thus, it is important for the key manager 58 to provide sufficient facilities for seamless interoperation among keylets.

For example, a bookmark manager will typically integrate with password manager functionality so that when a user gets to a page through the bookmark manager, the password manager will automatically be invoked to provide the proper password for the bookmarked page. Some of the functions provided by the key manager 58 facilitate installation and use of various encryption certificates for use with one or more keylets and files associated therewith. Further, the key manager 58 may facilitate the updating of software on the key 10 as well as facilitate backup of information to a certain computer, which will be discussed in greater detail below.

The key manager 58 may act as a central authority for registration of services and permissions associated with various keylets. For example, when a keylet is installed on the key 10, it may register its data file and specify its default read or write permissions by defined application class or by specific application. Continuing with our example, a bookmark manager will typically want to expose the bookmarks to other applications with read permission only. This will allow a password manager to identify the web site being accessed and offer password services to the user. Although a key manager 58 is not necessary for various aspects of the present invention, the use of a key manager 58 in embodiments incorporating multiple keylets requiring interaction with one another is preferred.

The key manager 58 in the preferred embodiment provides the following functionality.

File System Integrity

When the key 10 is disengaged from the host system without going through a normal termination process, files may be corrupted. For that purpose, the key manager 58 will provide a mechanism that will monitor the integrity of the data files and restore the latest state before corruption occurred.

Data File Encryption/Decryption

The keylets may need encryption and/or decryption services to access data files. The key manager 58 will facilitate encryption and decryption as necessary for interoperation and access to the data files.

Access Permissions

As noted, the key manager 58 will preferably facilitate seamless interoperation among keylets. The keylets will preferably register with the key manager 58 when they are first installed on the key 10. When registering, the keylets will provide access permission information about the data files with which they are associated. For example, access permissions may include read/write, read only, or match only, based on the class and security level of the keylets, as defined below.

Insertion/Deinsertion Management

The key manager 58 may provide termination for the key 10, based on either a time limit expiring, a user clicking on the end button 84 of the launching bar 76, or a user failing to provide the correct name and password during an authentication routine.

User Authentication

As mentioned above, a user may be required to provide a correct name and password for authentication. If a faulty authentication is provided, the key manager 58 may provide further questions to prevent fraudulent use of the key 10. Further, the key manager 58 may keep a log of these uses for historical purposes.

Password Assistance

Once authentication is provided, the key manager 58 may provide help with changing passwords, if desired by the user or required by the expiration of a current password.

The present invention provides the opportunity for multiple levels of security and use with hosts 12 having various degrees of trustworthiness. As an example, the preferred embodiment of the present invention provides for three types of host systems: home systems, trusted systems, and public systems. These definitions are based on the user's level of trust as far as how much data, if any, is allowed to be exposed on any particular system. The table below shows the types of applications recommended (X) and possible with an override (U) with respect to each type of system. The user has the ability to declare which systems are trusted systems and public systems, while home systems are determined by the installation of initialization software. A single key 10 may be used with any number of systems and recognize the different types accordingly.

| Service | Home System | Trusted System | Public Systems |
| --- | --- | --- | --- |
| Generation of Public Key Pair | X | | |
| Acquisition of X.509 Certificate | X | | |
| Set Up User's Authentication Information | X | | |
| Backup to HDD | X | U | |
| Software Installations | X | U | |
| Software Upgrades | X | U | U |
| Cache Browser on HDD | X | X | |
| Backup to Web-based Service | X | X | X |

The home system is defined as that which provides for the initialization of the key. When a user receives the key 10, she may install initialization software on a host 12, such as a personal computer (PC). This software may be initially contained within or separate from the key 10 itself. Then, the key 10 must be initialized. Performing the initialization will include the following steps:

Setting up the user's authentication information;

Generating a public key pair that will reside on the key 10; and

Acquiring encryption certificates that will reside on the key 10.

In addition to initializing the key 10, the software is capable of performing backups to the hard disk drive of the PC and performing software installations and upgrades.

Typically, the home system used for initialization will be the user's "private" system, such as that used at home or at the office and protected with a password. The software of the present invention will provide means to protect private or confidential information contained on the home system. Importantly, multiple PCs may be used as home systems.

Trusted systems are systems like office PCs or other PCs that are not likely to be intentionally inspected. The first time the key 10 interacts with a host 12, the key 10 will search the system for a registry entry to determine its type. If no type is found, a keylet will execute and generate a prompt to the user asking the type of system. At that point, the user may choose to label the system a trusted system, indicating that a privacy risk is acceptable in order to obtain certain benefits. The limited memory capacity on the key 10 may prevent it from storing browser cache. As such, trusted systems may allow the key to keep browser cache on the hard disk drive.

Public systems are assumed to be non-trusted systems where additional security and privacy measures are necessary, such as kiosks in public shopping areas, automated teller machines (ATMs), PCs not belonging to the user, and the like.

In addition to optionally categorizing host systems, various security levels for the individual keylets may be defined. For example, keylets may be defined as having either level 1 or level 2 security. As such, level 1 security may correspond to those keylets requiring higher levels of security or privacy, such as those containing transactional information or passwords. As such, the corresponding keylets may only store data on the key 10 and only backup the information to web-based services through secure interaction. For level 2-based keylets, less security may be mandated. A bookmark manager function may fall in this category, wherein the corresponding keylet may store the data on the key 10 or other web-mapped drives.

Regardless of the class and security level, keylets may be configured to encrypt and decrypt data files, or reserve this functionality for the key manager 58. To enhance security, keylets may be configured to be started only through the software of the present invention, and updated using only a home system.

The keys 10 may have various combinations of memory and interface types. The memory types may include: flash memory with hard disk drive emulation; SRAM-based, typically with hard disk drive emulation and a battery backup; internally mapped device memory; or memory, such as that used in a smart card, which does not require or use hard disk drive emulation. The interfaces may include those standard for personal computers, such as the universal serial bus (USB), IEEE 1392, etc., or wireless interfaces, such as that provided by Bluetooth, IEEE 802.11, and the like.

Regardless of the type of memory and interface, the keys 10 will be able to interface to the hosting computer where keylets can execute, and emulate the file systems of the hosting computer and store data files and keylets. In addition to computers, personal digital assistants (PDAs), and mobile telephones, hosts 12 may also include various types of kiosks, such as automated teller machines (ATMs) and the like. Keys 10 may emulate various types of Windows- and UNIX-based systems and the like.

What is claimed is:

1. A portable device comprising:
   a) a body;
   b) memory within the body containing software and data relating to configuration information for a program on a host computing device; and
   c) an interface associated with the memory and adapted to facilitate interaction with the host computing device;
   the software adapted to automatically execute on the host computing device after the host computing device recognizes a presence of the portable device and instruct the host computing device to launch the program on the host computing device and provide a customized configuration for the program based on the data, and said software further adapted to delete records of user interaction from the host computing device at the end of a computing session involving the portable device, wherein said records include cookies, histories and information in cache.

2. The portable device of claim 1 wherein the program launched on the host computing device is a browser.

3. The portable device of claim 2 wherein the configuration information includes bookmarks to web sites, the bookmarks stored as the data on the portable device.

4. The portable device of claim 1 wherein the program launched on the host computing device controls interface settings for a user interface of the host computing device.

5. The portable device of claim 4 wherein the configuration information defines certain of the interface settings of the host computing device.

6. The portable device of claim 1 wherein the software is further adapted to cause the program launched on the host computing device to access the data in the memory instead of select data on the host computing device, wherein the host computing device would normally access the select data on the host computing device when the portable device is not present.

7. The portable device of claim 1 wherein the software is adapted to emulate a file system resident on the host computing device when interacting with the host computing device.

8. The portable device of claim 1 wherein the software and the data are adapted to appear as a file system to the host computing device.

9. The portable device of claim 1 wherein the interface is adapted to directly interface a port in the host computing device.

10. A The portable device of claim 1 wherein the interface is adapted to provide a wireless interface with the host computing device.

11. The portable device of claim 1 wherein the software includes a plurality of keylets that are independently executable on the host computing device to provide at least one function, including recognizing the presence of the portable device and instructing the host computing device to launch the program on the host computer device and provide a customized configuration for the program.

12. The portable device of claim 1 wherein the software is further adapted to provide an authentication routine upon the host computing device recognizing the presence of the portable device and before instructing the host computing device to launch the program on the host computing device, the authentication routine including receiving authentication indicia from a user of the portable device via an interface on the host computing device and determining if the authentication indicia received from the user matches authentication indicia stored in the memory.

13. The portable device of claim 1 wherein the software is further adapted to use encryption to protect select data used during interaction and stored as the data.

14. The portable device of claim 1 wherein the software is further adapted to update the data based on changes to the data occurring while the software is executing on the host computing device.

15. A computer readable storage medium including software to reside on a portable device capable of interacting with a plurality of host computing devices, the software comprising instruction to:
   a) automatically execute on the host computing device after the host computing device recognizes the presence of the portable device;
   b) instruct the host computing device to launch a program resident on the host computing device;
   c) access configuration information stored on the portable device;
   d) customize the configuration of the program based on the configuration information; and
   e) delete records of user interaction from the host computing device at the end of a computing session involving the portable device wherein said records include cookies, histories and information in cache.

16. The computer readable storage medium of claim 15, wherein the program launched on the host computing device is a browser.

17. The computer readable storage medium of claim 16, wherein the configuration information includes bookmarks to web sites, the bookmarks stored as the data on the portable device.

18. The computer readable storage medium of claim 15 wherein the program launched on the host computing device controls interface settings for a user interface of the host computing device.

19. The computer readable storage medium of claim 18 wherein the configuration information defines certain of the interface settings of the host computing device.

20. The computer readable storage medium of claim 15 comprising further instructions to cause the program launched on the host computing device to access the data in the memory instead of select data on the host computing device, wherein the host computing device would normally access the select data on the host computing device when the portable device is not present.

21. The computer readable storage medium of claim 15 wherein the software is adapted to emulate file system resident on the host computing device when interacting with the host computing device.

22. The computer readable storage medium of claim 15 wherein the software and the data stored on the portable device are adapted to appear as a file system to the host computing device.

23. The computer readable storage medium of claim 15 wherein the software includes a plurality of keylets that are independently executable on the host computing device to provide at least one function, including recognizing the presence of the portable device, instructing the host computing device to launch the program on the host computing device and providing a customized configuration for the program.

24. The computer readable storage medium of claim 15 wherein the software is further adapted to provide an authentication routine upon the host computing device recognizing the presence of the portable device and before instructing the host computing device to launch the program on the host computing device, the authentication routine including receiving authentication indicia from a user of the portable device via an interface on the host computing device and determining if the authentication indicia received from the user matches authentication indicia stored in the memory.

25. The computer readable storage medium of claim 15 wherein the software is further adapted to update the data based on changes to the data occurring while the software is executing on the host computing device.

26. A method comprising:

recognizing a presence of a portable device having software at a host computing device;

executing the software on the host computing device;

launching a program resident on the host computing device based on the software;

accessing configuration information for the software stored on the portable device;

customizing the configuration of the program on the host computing device based on the configuration information; and deleting, as a function of the software on the portable device, records of user interaction from the host computing device at the end of a computing session involving the portable device wherein said records include cookies, histories and information in cache.

27. The method of claim 26 wherein the program launched on the host computing device is a browser.

28. The method of claim 27 wherein the configuration information includes bookmarks to web sites, the bookmarks stored as the data on portable device.

29. The method of claim 26 wherein the program launched on the host computing device controls interface settings for a user interface of the host computing device.

30. The method of claim 29 wherein the configuration information defines certain of the interface settings of the host computing device.

31. The method of claim 26 further comprising:

a) executing an authentication routine based on the software;

b) receiving authentication indicia from a user of the portable device via an interface on the host computing device; and c) determining if the authentication indicia received from the user matches authentication indicia stored on the portable device.

32. The method of claim 26 wherein the software is further adapted to update data stored on the portable device based on changes to the data occurring while the software is executing on the host computing device.

* * * * *